US006533627B1

(12) United States Patent
Ambs

(10) Patent No.: US 6,533,627 B1
(45) Date of Patent: Mar. 18, 2003

(54) METHOD AND APPARATUS FOR DYNAMICALLY CONTROLLED BUOYANCY OF TOWED ARRAYS

(75) Inventor: Loran D. Ambs, Fairfax, VA (US)

(73) Assignee: Westerngeco, L.L.C., Houston, TX (US)

( * ) Notice: Subject to any disclaimer, the term of this patent is extended or adjusted under 35 U.S.C. 154(b) by 0 days.

(21) Appl. No.: 09/965,308

(22) Filed: Sep. 27, 2001

(51) Int. Cl.[7] ............................................... B63B 22/00
(52) U.S. Cl. ...................... 441/133; 114/245; 114/331
(58) Field of Search .............................. 114/245, 264, 114/331; 441/133

(56) References Cited

U.S. PATENT DOCUMENTS

| 3,272,910 A | * | 9/1966 | Flint | 114/133 |
| 3,902,439 A | * | 9/1975 | Majkrzak | 114/245 |
| 3,909,774 A | * | 9/1975 | Pavey, Jr. | 114/245 |
| 5,138,582 A | * | 8/1992 | Furu | 114/245 |
| 5,596,943 A | * | 1/1997 | Horton | 114/245 |
| 6,028,817 A | | 2/2000 | Ambs | 367/16 |

FOREIGN PATENT DOCUMENTS

GB      WO 98/28636     7/1998

* cited by examiner

*Primary Examiner*—Stephen Avila
(74) *Attorney, Agent, or Firm*—David S. Figatner; Madan, Mossman & Sriram, P.C.

(57) ABSTRACT

The present invention relates generally a method and apparatus for adjusting the buoyancy of towed seismic arrays comprising a plurality of streamers and specifically to the dynamic buoyancy control of the buoyancy of a towed array of streamers by means of applying current to electroactive polymers (EAP) incorporated within the towed array of seismic streamers. The bulk density of the streamer array is electrically altered to accomplish neutral buoyancy for a towed array of streamers within the full range of water-densities from fresh to extremely dense seawater.

22 Claims, 3 Drawing Sheets

METHOD AND APPARATUS FOR DYNAMICALLY CONTROLLED BUOYANCY OF TOWED ARRAYS

BACKGROUND OF THE INVENTION

1. Field of the Invention

The present invention relates generally a method and apparatus for dynamically adjusting the buoyancy of towed seismic arrays comprising a plurality of seismic sensors and specifically to the dynamic buoyancy control of a towed seismic array by means of activating electroactive polymers (EAP) incorporated within the towed seismic array. The bulk density of the seismic array is electrically altered to accomplish neutral, negative or positive buoyancy for a towed array of seismic sensors within the full range of water-densities, temperatures and salinities from fresh to extremely dense and saline seawater.

2. Summary of the Related Art

The related art discloses a wide variety of towed marine seismic tracking and positioning systems and methods typically comprising one or more seismic arrays (also known as streamers) and/or one or more seismic sources. Many of these seismic tracking and positioning systems and methods utilize a main or host vessel and/or other associated unmanned vessels or vehicles to tow the seismic array. Typically, towing is controlled or guided by a central control system. The known marine seismic tow tracking and positioning systems and methods are comprised of apparatuses such as seismic hydrophone streamers and attached floats, paravanes, and/or buoyant members. Typically each streamer and control apparatus is connected to the host vessel by a line, cable or tether. Considerable towing power is required of a host vessel to tow existing seismic streamer systems, cables and interconnecting sensing devices. A typical host vessel is capable of towing a plurality of seismic streamers. When the streamers are not deployed, they and their associated support apparatus are carried on the vessel's deck. In some cases, multiple tow vessels will operate cooperatively to provide greater flexibility in the positioning and control of seismic streamers.

One such system for positioning and control of marine seismic streamers is taught in the international application published under the Patent Cooperation Treaty (PCT), International Publication Number WO 00/20895, international publication date Apr. 13, 2000. A marine seismic system with independently powered tow vehicles is taught by U.S. Pat. No. 6,028,817. A control device for controlling the position of a marine seismic streamer is taught in the international application published under the Patent Cooperation Treaty (PCT), International Publication Number WO 98/28636, international publication date Jul. 2, 1998.

With known seismic streamer towing, tracking and positioning systems, the location and spacing of system components is limited by the type, size, and length of cables used and by the characteristics of the towing vehicles and other control devices utilized by the known seismic tracking and positioning systems. The plurality of towed seismic streamers form an array which is towed behind the host vessel. Typically, changing the buoyancy and/or depth of such a towed streamer array, comprised of known components is a complex, cumbersome, time-consuming operation and can often become somewhat unwieldy.

A control device or "bird" for controlling the depth and horizontal position of a seismic streamer is taught by WO patent application WO 98/28636, international publication date Jul. 2, 1998. The bird has two opposed wings which are independently controllable in order to control the streamers lateral position as well as its depth. These mechanical birds create turbulence which may interfere with the seismic signal sensed by the streamers during data acquisition. The mechanical birds also generate a tremendous amount of drag on the towing vessel which increases the amount of force needed to pull the streamer through the water during a data acquisition run. This increase in required force also increases the size and cost of the towing vessel. Additional horsepower and increased fuel capacity require larger and therefore more expensive tow vessels. Increased fuel consumption required to overcome the drag of mechanical birds increases the recurring costs of fuel.

The mechanical birds also must be manually attached to the seismic streamer cable and manually removed from the streamer during streamer retrieval. Attachment and removal of the mechanical birds is a labor-intensive, time-consuming process that adds significantly to the cost of data acquisition.

There are many problems associated with establishing and changing the buoyancy of streamers. During the design and fabrication of streamers, great care is taken to properly balance the amount of positively buoyant materials incorporated to offset the weight of negatively buoyant electrical and mechanical components to produce a bulk density very near to neutral buoyancy in seawater to a high degree of precision. Adjusting the buoyancy of a streamer to accommodate differences in seawater temperature and salinity requires addition or subtraction of ballasting weights. Seismic equipment is typically operated at relatively shallow water where the temperature and salinity are subject to significant variation with time and location. Seismic operations can span large distances and large areas. A streamer neutrally balanced for seawater at one time and place will not necessarily be balanced for other times and locations.

A streamer ballasted too heavily or too lightly requires the mechanical birds to provide a correcting force to position the streamer at the desired depth. The greater the imbalance, the greater the wing angle on the bird. Increased wing angles increase drag and acoustic noise. A streamer improperly ballasted may become uncontrollable if the birds cannot provide sufficient lift. Lift is proportional to the velocity of the streamer through the water. Streamer velocity may decrease due to a decreased velocity of the tow vessel. If the streamer should have no velocity (whether due separation from the tow vessel or a stopped tow vessel), the mechanical birds are incapable of producing forces to affect the depth of the streamer. Streamer velocity may also decrease during turns of the streamer array. For multi-streamer arrays, the streamers on the inside of the turn will move relatively slower than those on the outside of the turn.

If the streamer is ballasted too lightly, the streamer will float and the streamer velocity is too low to produce the force required to depress the streamer, it will float on the surface and require operator intervention to increase the ballasting of the streamer. Operator intervention takes significant time and effort that adversely affects the operational efficiency of the data acquisition system. If streamers are too heavily ballasted, they will sink if the mechanical birds cannot produce the lift required to control the depth of the streamer. Such loss of depth control may result in the irretrievable loss of the streamer resulting in a significant material loss and reduce operational efficiency of the seismic system.

Prior art solutions, designed to prevent streamers from diving too deeply, attached emergency floatation bags that filled with gas when onboard sensors detect an over-depth streamer condition. The gas to fill a buoyancy bag is provided by cylinders of compressed air or the byproduct of a pyrotechnic device. In addition to the increased cost of using buoyancy bags, they add to the effort and expense of deploying and retrieving streamers and add to the drag and acoustic noise provided by the streamer.

Finally, some streamers are fabricated with compressible materials to provide buoyancy. Compressible materials change buoyancy as a function of depth. This undesirable characteristic amplifies an imbalance in ballasting. A streamer ballasted too lightly becomes lighter the shallower it goes and a streamer ballasted too heavy becomes heavier as it sinks. These conditions add to the work required from mechanical birds and can result in the loss of depth control for the streamer.

Thus, there is a need for a method and apparatus that controls the depth of seismic streamers during data acquisition runs that creates less turbulence, less drag and enables dynamic control of the buoyancy of seismic streamers. There is also a need for a seismic streamer that floats when severed from the towing vessel.

SUMMARY OF THE INVENTION

The present invention provides a method and apparatus for dynamically adjusting the buoyancy of towed seismic arrays comprising a plurality of seismic sensors. The present invention enables dynamic buoyancy control of a towed array of seismic sensors by applying electric stimulus to electroactive polymers (EAP) incorporated within the streamer. The bulk density of the streamer is electrically altered to accomplish neutral buoyancy for a streamer within the full range of water-densities from fresh to extremely dense seawater. The present invention enables depth control of a towed array of seismic streamers under a variety of water density conditions that vary with time, temperature and location. The dynamic buoyancy control of the present invention enables towed seismic streamer depth control using fewer or no external mechanical depth control devices or birds attached to the streamer. The use of fewer external devices on the towed seismic streamer array creates less drag and less turbulence during towing, thereby providing a more efficient and quieter streamer array.

DETAILED DESCRIPTION OF A PREFERRED EMBODIMENT

To one skilled in this art who has the benefit of this invention's realizations, teachings, disclosures, and suggestions, other purposes and advantages will be appreciated from the following description of preferred embodiments, given for the purpose of disclosure, when taken in conjunction with the accompanying drawings. The detail in these descriptions is not intended to thwart this patent's object to claim this invention no matter how others may later disguise it by variations in form or additions of further improvements.

Figure 1:
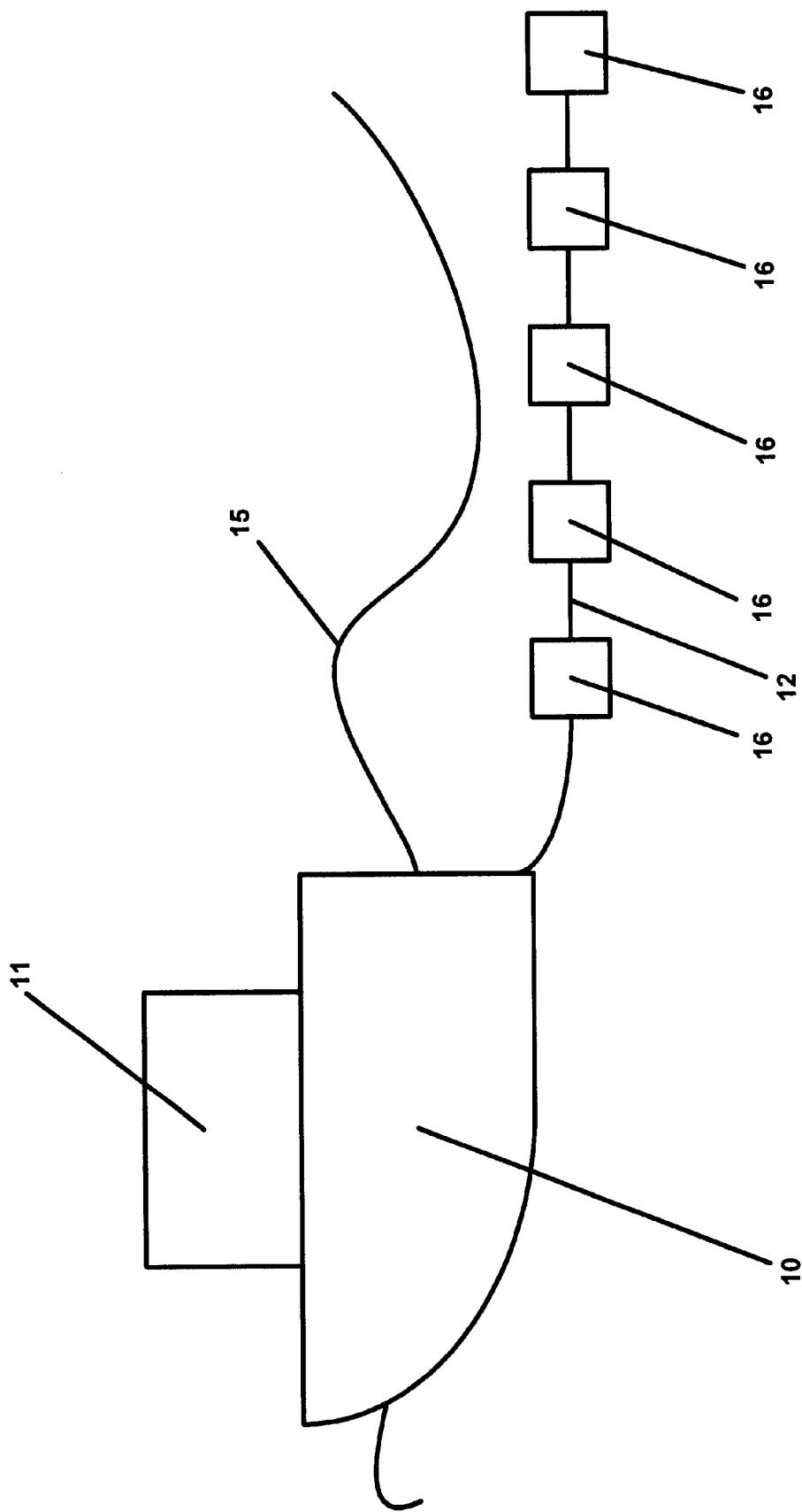
FIG. 1 is an illustration of a known marine seismic towing system showing a towing and control vessel and a trailing streamer utilizing known mechanical deflectors to maintain desired streamer depth below the surface of the water.

Turning now to FIG. 1, a seismic survey vessel 10 is shown towing a marine seismic streamer 12 that may, for instance be 3000 meters in length. As shown in FIG. 1, at the front of and along the length of each streamer 12 is shown a plurality of attached mechanical deflectors 16 or birds to maintain the vertical position or depth of the seismic streamer beneath the surface 15 of the water. The tension created on the seismic streamer and the plurality of deflectors 16 results in drag on the seismic streamer 12 and associated towing vessel shown in FIG. 1. Thus, the deflectors 16 increase the amount of towing force needed and fuel expended by the source vessel to pull the seismic streamer and attached deflectors though the water. The deflectors also create a large amount of turbulence and associated noise within the bandwidth of geophysical investigation, thereby reducing the signal to noise ratio of the desired seismic signal.

Figure 2:
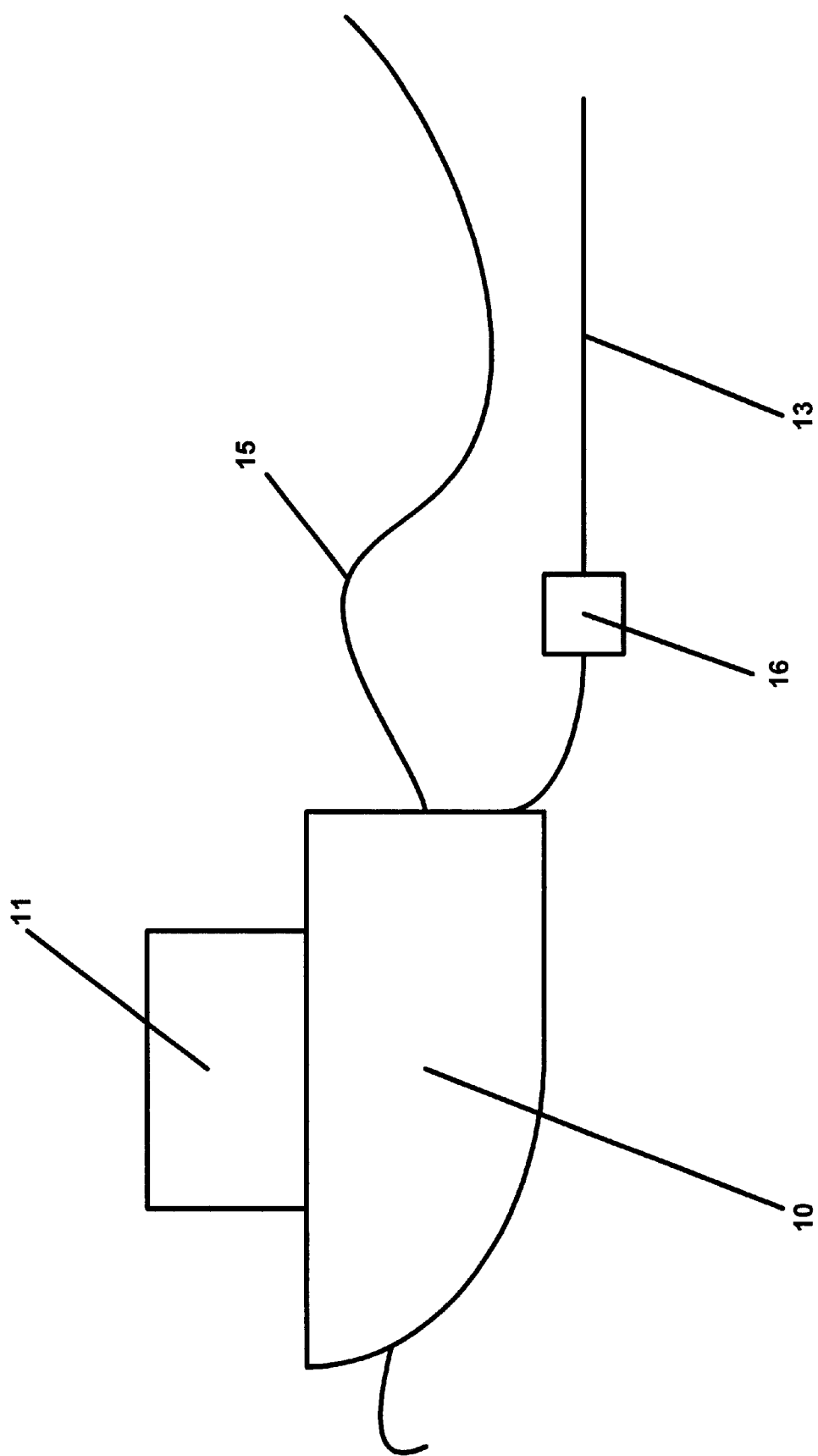
FIG. 2 is an illustration of a known marine seismic towing system showing a towing and control vessel and a trailing streamer utilizing an electroactive polymer filling to dynamically control buoyancy to maintain desired streamer depth below the surface of the water.

As shown in FIG. 2, a preferred towing system is shown towing a seismic streamer. The steamer 13 is the preferred dynamic buoyancy controlled streamer of the present invention. Each streamer 13 is shown with a single attached mechanical deflector 16 or bird provided to maintain the vertical position or depth of the seismic streamer. The tension created on the seismic streamer by the single deflector 16 results in greatly reduce drag on the seismic streamer 12 and associated towing vessel shown in FIG. 2. Thus, the single deflector 16 reduces the amount of towing force needed and fuel expended by the source vessel to pull the seismic streamer and single attached deflector though the water. The single deflector also generates less turbulence and thus less associated noise within the bandwidth of geophysical investigation, thereby increasing the signal to noise ratio of the desired seismic signal. The system includes a controller 11 comprising a computer and associated memory. Alternatively, the streamer depth can dynamically control the streamer buoyancy by the present invention without attached mechanical deflectors.

For a towed array of steamers to be buoyant in fresh water, the towed array bulk density must be less than 1.0 g/cc. In order for the steamer bulk density to be denser than dense seawater, it's bulk density must be greater than 1.02478 g/cc (with Salinity=35 ppt and Temperature=20 degree Centigrade). A seismic streamer or cable designed to float in fresh water can be made negatively buoyant so that it sinks below the surface of the water in even the densest seawater by causing a three per cent increase in the bulk density of the seismic streamer.

The preferred electroactive polymer (EAP) material of the present invention changes in density by electric stimulus and control, thus enabling an seismic streamer operator to dynamically change the bulk density of a towed array. An automated control system 11 on the towing vessel is provided to enable selective electric stimulus to increase the bulk density of the towed streamer array to drive it down to a desired depth. The present invention enables an operator to adjust the depth of the towed streamer array without the aid of mechanical depressors. The present invention enables depth control by way of dynamic buoyancy control, even in areas where the density of the seawater changes with time and/or position. Each streamer and each streamer segment of a towed seismic array is independently controlled. Thus each streamer in an array can be maintained at a different depth and each segment can be adjusted individually as desired.

In a preferred embodiment, a single depressor at the leading end of the towed seismic array establishes the depth of the dynamically ballasted, buoyancy controlled towed seismic array. Reducing the number of depressors enables the towed seismic array to travel through the water with less drag and less turbulence, thereby providing a quieter and more efficient towed seismic array. The reduction of drag reduces the towing power requirements necessary to pull the towed seismic array through the water. The reduction of birds attached to the towed seismic array reduces the associated man-power and hardware requirements and thus the expense of attaching and detaching a plurality of birds during deployment and retrieval of the towed seismic array. Dynamic electric control of array density also frees the users from the efforts of site-specific mechanical ballasting prior to deployment in a variety of buoyancy conditions.

The preferred general class of materials that change their volume (or shape) in response to electrical stimuli are referred to as electroactive polymers or EAPs. These EAP materials change shape in response to an applied electric or magnetic field, light, pH, and/or stress. This general class of EAP materials can be subdivided into several types of material, comprising gels, ionic polymer metal composites, conductive polymers, and electrostrictive polymers. Gels can change volume by a factor of up to 1000 and conductive polymers can change volume by a factor of about 2 under electric control. (See, Electroactive Polymer Actuators and Devices, Proceedings of the SPIE, Smart Structures and Materials (1999)).

Use of an EAP material in a towed seismic streamer enables a towed array to become positively buoyant when electric power is turned off or lost when the towed array is severed from electric power. By becoming positively buoyant when power is lost or the cable is severed prevents the towed seismic array from sinking and possible loss if severed from the towing vessel or if the tow vessel comes to a complete stop. EAP materials can be shaped as film, strings or other solids that fit within the confines of the seismic streamer skin. In a preferred embodiment, the EAP material contracts as a charge is applied. Thus, the EAP and associated streamer is less dense and most buoyant in the absence of a charge. When a stimulus is applied the EAP material contracts, decreasing the amount of water displaced by the streamer, thereby making the streamer less buoyant. Thus, the present invention enables design of a streamer that sinks beneath the water surface to a desired depth when a charge is applied and floats on the surface of the water when the charge is turned off or the streamer is severed from the charge source. This enables easy retrieval of the streamer when power is turned off or the cable severed.

In a preferred embodiment, the preferred EAP material is incorporated into the towed seismic streamer to provide dynamically controlled changes in bulk density for the towed streamer. Changes in bulk density of between 0.95 g/cc to 1.05 g/cc are provided by dynamic electrical control. The preferred embodiment operates in water depths of between 0 and 300 meters. The preferred EAP is capable of changing the density of a towed streamer array between maximum and minimum density in less than two minutes.

Figure 3:
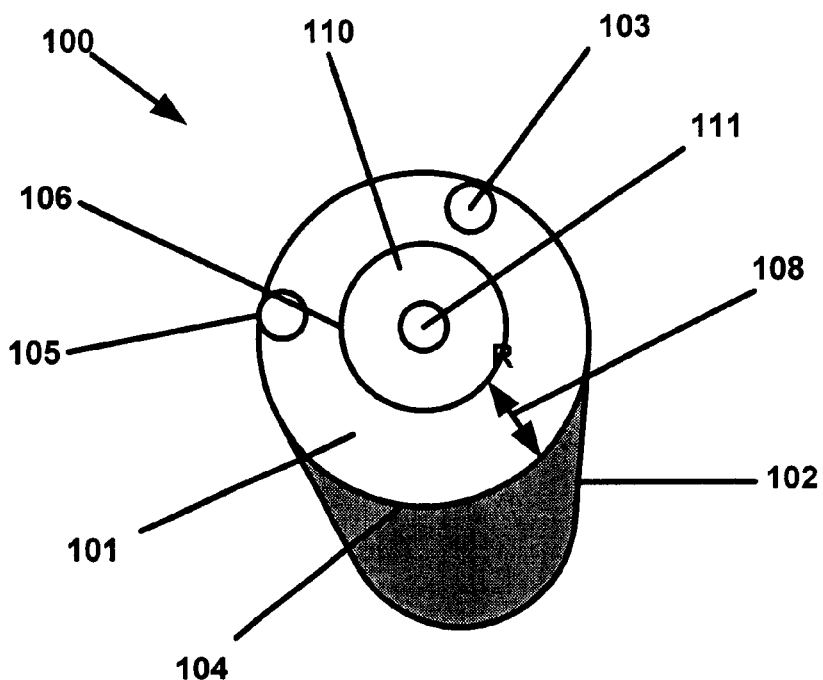
FIG. 3 is an illustration of a preferred embodiment of a dynamically controlled buoyant cable containing electroactive polymer material inside of the exterior skin of a liquid filled seismic streamer cable.

Turning now to FIG. 3, a preferred embodiment of the present invention is shown. As shown in FIG. 3, streamer 100 comprises an external streamer skin 102 surrounding internal seismic sensor 103. Streamer core materials, 110, typically provide a central strength member, data telemetry lines and one or more electrical conductors 111. Electroactive polymer material 101 surrounds the streamer core 110 and conductor 111, occupying the interior volume of cable 100 to the exterior skin. An electric stimulus or charge is applied to the electroactive polymer material 101 via conductor 111 under control from the source towing vessel 10. Control system 11 senses the depth of streamer 100 with depth sensor 105. The control system 11 incrementally adjust the buoyancy of electroactive polymer material 101 within each streamer and each streamer segment to achieve the depth set by the operator. Alternatively, the source vessel may estimate seawater density from temperature and/or salinity measurements and set the streamer bulk density to match seawater density.

As the electric stimulus is applied to electroactive polymer material, radius R 108 contracts or expands in proportion to the amount of stimulus applied to the eletroactive polymer material 108. In the preferred embodiment, radius R decreases as electric stimulus is applied to electroactive polymer material 101, and the density increases as the buoyancy of streamer 100 decreases. The stimulus is variable and controllable with respect to amplitude and rate of application and can be current, voltage, variable capacitance, electromagnetic, chemical stimulus or a combination of stumuli. Sensing of the temperature, salinity and depth of the streamer by the controller 11 or the source towing vessel 10, enables interactive control of the charge applied to electroactive buoyancy material for the streamer to adjust to changing temperature, depth and salinity conditions.

Temperature, depth and salinity are sampled by typical methods well known in the art. The type of streamer, type and number of deflectors employed are also determined and input by a vessel controller operator to be stored in the controller 11. Streamer array configuration characteristics, gross buoyancy and prior or predicted dynamically buoyancy control stimulus history from a previous data acquisition runs is stored in the controller memory along with each type of seismic streamer utilized. Streamer gross buoyancy characteristics are also stored for each type of seismic streamer utilized. The type of streamer, number and type of deflectors and gross buoyancy characteristics are used by the controller to determine the amount of charge to be applied to the streamer to generate the desired buoyancy for the particular streamer in use.

Figure 4:
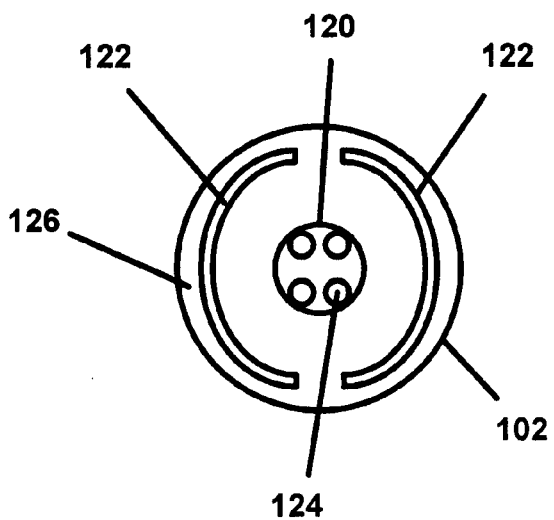
FIG. 4 is an illustration of an alternative embodiment of the present invention showing the preferred electroactive polymer material inside of the exterior skin of a solid seismic streamer cable.

Turning now to FIG. 4, FIG. 4 is an illustration of an alternative embodiment of the present invention showing the preferred electroactive polymer material in cross section inside of the exterior skin of a solid seismic streamer cable. A shown in FIG. 4, a center core 120 with conductors 124 is positioned in the center of the streamer. Electroactive polymer sections 122 are provided inside of the streamer surrounded by solid cable sections 126.

Figure 5:
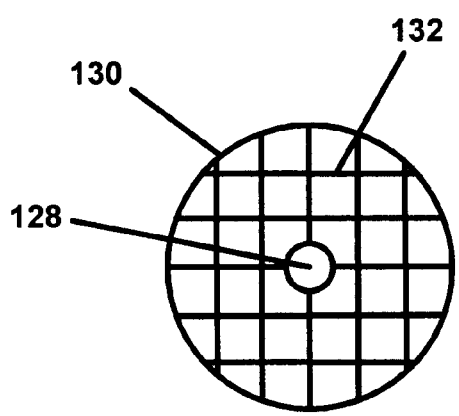
FIG. 5 is an illustration of another alternative embodiment of the present invention showing the preferred electroactive polymer material inside of the exterior skin of a solid seismic streamer cable.

Turning now to FIG. 5, FIG. 5 is an illustration of another alternative embodiment of the present invention showing the preferred electroactive polymer material inside of the exterior skin of a solid seismic streamer cable. As shown in FIG. 5, electroactive polymer material 132 comprising a gel is provided as a dynamic buoyancy agent surrounding central core 128 inside of streamer skin 130.

In a preferred embodiment, the dynamically controlled buoyancy towed seismic streamer can operate effectively in water temperatures between 0 degrees C. and 35 degrees C. and can be stored in temperatures between −20 C. and 85 C. The preferred dynamically controlled buoyancy streamer operates in a closed system that is non-toxic to humans from exposure by contact, inhalation, or ingestion. The preferred material is non-explosive, non-corrosive and non-reactive with PVC, polyurethane, electrical insulators, and synthetic fibers such as kevlar. The natural state or off state, such as when the dynamically controlled buoyancy array is un-powered or becomes separated from controller provides a density less than 1.0 g/cc so that the streamer floats even in fresh water.

The preferred embodiment of the present invention does not affect performance of hydrophones inside of the cable. The preferred embodiment also does not generate internal or external noise within the seismic bandwidth. The preferred EAP material also does not interfere with internal/external compass or acoustic devices. Additional internal wiring is minimized and external wiring is preferably not employed.

Preferably, the EAP material can adjust the bulk density of the towed seismic array from maximum to minimum density or from minimum to maximum density in less than 1 minute. The preferred EAP material is non-toxic to marine life from exposure by contact, inhalation, or ingestion. While electroactive polymers have been used in the foregoing example, any other apparatus or method for dynamically expanding or contracting the diameter of a streamer may be used.

The present invention is an improvement over presently known oil-filled cables that are typically over 100 meters long, 6.5 cm diameter with an enclosed volume of 332 liters and dry weight (mass) of 174 kg. The filled weight (mass) 333 kg and requires 241 liters of Isopar M (density of 0.66 g/cc) to fill. In a preferred embodiment, an EAP having a density of 0.66 g/cc would replace the Isopar. A 10% change in density of the EAP produces 5% change in density of streamer (0.95 to 1.05 g/cc).

The foregoing examples of preferred embodiments are provided by way of example only and are not intended to limit the scope of the patent which is defined by the following claims.

What is claimed is:

1. A dynamically buoyant seismic streamer comprising:
   an elongated cable having an interior volume surrounded by an external skin;
   a buoyancy adjustable material positioned inside of the interior volume of the cable; and
   a stimulus applied to the buoyancy adjustable material for controlling the buoyancy of the cable.

2. The streamer of claim 1 wherein the buoyancy adjustable material comprises a volume adjustable substance.

3. The streamer of claim 2 wherein the volume adjustable material comprises an electroactive polymer.

4. The streamer of claim 1 wherein the stimulus comprises at least one of an electric, light, pH, stress or chemical stimulus.

5. The streamer of claim 3 wherein the electroactive polymer material comprises at least one of a film, string, liquid, gel or solid.

6. The streamer of claim 1 wherein the streamer exhibits a positive buoyancy in seawater when no stimulus is applied and the streamer exhibits a negative buoyancy in seawater when the stimulus is applied.

7. The streamer of claim 1 further comprising a streamer controller comprising:
   sensors for sensing environmental factors the affect the buoyancy of the streamer, wherein the controller adjusts the stimulus to the buoyancy adjustable material to account for changes in the environmental factors to maintain the streamer at a constant depth.

8. A dynamically buoyant seismic streamer comprising:
   an elongated cable having an interior volume surrounded by an external skin;
   a electroactive polymer comprising a volume adjustable material positioned inside of the interior volume of the cable; and
   a stimulus comprising at least one of an electric, pH, chemical, stress or light stimulus, the at least one applied to the buoyancy adjustable material for controlling the buoyancy of the cable.

9. The streamer of claim 8 wherein the electroactive polymer material comprises at least one of a film, string, liquid, gel or solid, wherein the streamer exhibits a positive buoyancy in seawater when no stimulus is applied and the streamer exhibits a negative buoyancy in seawater when the stimulus is applied.

10. The streamer of claim 8 further comprising a streamer controller comprising:
    sensors for sensing environmental factors the affect the buoyancy of the streamer, wherein the controller adjusts the stimulus to the buoyancy adjustable material to account for changes in the environmental factors to maintain the streamer at a constant depth.

11. A dynamically buoyant seismic streamer comprising:
    an elongated cable having an interior volume surrounded by an external skin;
    a electroactive polymer comprising a volume adjustable material positioned inside of the interior volume of the cable;
    a stimulus comprising at least one of an electric, pH, chemical, stress or light stimulus, the at least one stimulus applied to the electroactive polymer material for controlling the buoyancy of the cable, wherein the electroactive polymer material comprises at least one of a film, string, liquid, gel or solid, wherein the streamer exhibits a positive buoyancy in seawater when no stimulus is applied and the streamer exhibits a negative buoyancy in seawater when the stimulus is applied; and
    sensors for sensing environmental factors the affect the buoyancy of the streamer, wherein the controller adjusts the stimulus to the buoyancy adjustable material to account for changes in the environmental factors to maintain the streamer at a constant depth.

12. A method for dynamically controlling the buoyancy of a seismic streamer comprising:
    surrounding an interior volume of an elongated cable by an external skin;
    positioning a buoyancy adjustable material inside of the interior volume of the cable; and
    stimulating the buoyancy adjustable material for controlling the buoyancy of the cable.

13. The method of claim 12 wherein the buoyancy adjustable material comprises a volume adjustable substance.

14. The method of claim 13 wherein the volume adjustable material comprises an electroactive polymer.

15. The method of claim 12 wherein the stimulus comprises at least one of an electric, light, pH, stress or chemical stimulus.

16. The method of claim 14 wherein the electroactive polymer material comprises at least one of a film, string, liquid, gel or solid.

17. The method of claim 12 wherein the streamer exhibits a positive buoyancy in seawater when no stimulus is applied and the streamer exhibits a negative buoyancy in seawater when the stimulus is applied.

18. The method of claim 12 further comprising a streamer controller comprising:

sensing environmental factors the affect the buoyancy of the streamer; and controlling the stimulus to the buoyancy adjustable material to account for changes in the environmental factors to maintain the streamer at a constant depth.

19. A method for providing a dynamically buoyant seismic streamer comprising:

providing an elongated cable having an interior volume surrounded by an external skin;

providing an electroactive polymer comprising a volume adjustable material positioned inside of the interior volume of the cable; and providing a stimulus comprising at least one of an electric, pH, chemical, stress or light stimulus, the at least on applied to the buoyancy adjustable material for controlling the buoyancy of the cable.

20. The method of claim 19 wherein the electroactive polymer material comprises at least one of a film, string, liquid, gel or solid, wherein the streamer exhibits a positive buoyancy in seawater when no stimulus is applied and the streamer exhibits a negative buoyancy in seawater when the stimulus is applied.

21. The streamer of claim 20 further comprising a streamer controller comprising:

sensors for sensing environmental factors the affect the buoyancy of the streamer, wherein the controller adjusts the stimulus to the buoyancy adjustable material to account for changes in the environmental factors to maintain the streamer at a constant depth.

22. A method for dynamically controlling the buoyancy of a seismic streamer comprising:

providing an elongated cable having an interior volume surrounded by an external skin;

providing an electroactive polymer comprising a volume adjustable material positioned inside of the interior volume of the cable;

providing a stimulus comprising at least one of an electric, pH, chemical, stress or light stimulus, the at least one stimulus applied to the electroactive polymer material for controlling the buoyancy of the cable, wherein the electroactive polymer material comprises at least one of a film, string, liquid, gel or solid, wherein the streamer exhibits a positive buoyancy in seawater when no stimulus is applied and the streamer exhibits a negative buoyancy in seawater when the stimulus is applied; and sensing environmental factors the affect the buoyancy of the streamer, wherein the controller adjusts the stimulus to the buoyancy adjustable material to account for changes in the environmental factors to maintain the streamer at a constant depth.

* * * * *